United States Patent [19]

Taniguchi et al.

[11] Patent Number: 4,847,646
[45] Date of Patent: Jul. 11, 1989

[54] CAMERA ACCESSORY

[75] Inventors: Nobuyuki Taniguchi, Nishinomiya; Takeo Hoda, Kawachinagano; Yoshiaki Hata, Nishinomiya; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 203,543

[22] Filed: May 27, 1988

Related U.S. Application Data

[63] Continuation of Ser. No. 942,624, Dec. 16, 1986, abandoned.

[30] Foreign Application Priority Data

Dec. 17, 1985 [JP] Japan ................. 60-285260

[51] Int. Cl.4 ................. G03B 17/24; G03B 17/20
[52] U.S. Cl. ................. 354/106; 354/219; 354/289.1
[58] Field of Search ............ 354/105, 106, 109, 288, 354/295, 219, 289.1

[56] References Cited

U.S. PATENT DOCUMENTS

| 3,490,844 | 1/1970 | Sapp | 354/106 |
|---|---|---|---|
| 3,848,984 | 11/1974 | Kanno | 354/295 X |
| 4,361,388 | 11/1982 | Mlcak et al. | 354/106 |
| 4,362,369 | 12/1982 | Kazami et al. | 354/105 X |
| 4,583,831 | 4/1986 | Harvey | 354/106 |
| 4,639,111 | 1/1987 | Harvey | 354/106 X |

FOREIGN PATENT DOCUMENTS

| 54-26721 | 2/1979 | Japan | |
| 58-152227 | 9/1983 | Japan | |
| 59-191020 | 10/1984 | Japan | |
| 59-164037 | 11/1984 | Japan | |
| 59-164043 | 11/1984 | Japan | |
| 59-195601 | 11/1984 | Japan | |
| 33546 | 2/1985 | Japan | 354/106 |
| 60-145428 | 9/1985 | Japan | |

Primary Examiner—W. B. Perkey
Attorney, Agent, or Firm—Burns, Doane, Swecker & Mathis

[57] ABSTRACT

A camera accessory is provided which allows a camera to photograph in a pseudo focal length photographing mode. In the pseudo focal length photographing mode, a portion of an image recorded onto a film is reproduced on a print with larger enlargement than a normal image. Therefore, a print can be obtained as if it has been printed from an image recorded on a film which had been photographed by an objective lens having a focal length longer than the actual focal length of the objective lens used. Thus, according to the camera accessory, photographing in the pseudo focal length photographing mode can be possible if used in a camera which is originally incapable of the pseudo focal length photographing mode.

15 Claims, 15 Drawing Sheets

CAMERA ACCESSORY

This application is a continuation, of application No. 942,624, filed Dec. 16, 1986.

BACKGROUND OF THE INVENTION

1. Field of the invention

The present invention relates to a camera accessory, and more particularly to a camera accessory that can be used by replacing the back cover of a camera body.

2. Description of the Prior Art

There are known various attachments attachable in front of the ordinary objective lens having a fixed focal length, in lens shutter cameras, in order to allow the camera to take a picture at a longer focal length than the focal length of the objective lens. However, these attachments are very poor in optical performance and make it difficult to take pictures with satisfactory optical performance.

Cameras with an objective lens system having two selectable focal lengths are also proposed in recent years. However, such cameras are larger in size and more expensive than the cameras with objective lenses having fixed focal length.

Single-lens reflex cameras with lens interchangeable type may be used with an accessory such as a tele-converter which can be mounted between the objective lens and the camera body for extending the focal length of the photographing optical system composed of the objective lens and the tele-converter 1.4 or 2 times greater than that of the objective lens only. Such an accessory is also large in size and costly, and is further disadvantageous in that it lowers the performance of the photographing optical system when mounted. When the tele-converter is mounted and automatic focus adjustment is to be made of the photographing optical system by the motor in the camera body, many problems are required to be solved since the relationship between the driving amount produced by the motor and the shifting amount of the in-focus position of the photographing optical system corresponding to the driving amount becomes different by the tele-converter from that when the objective lens is only used.

Japanese Laid-Open Patent Publication No. 54-26721 discloses a camera proposed to solve the aforesaid problems of the conventional arrangements. The disclosed camera is selectively switchable into a real focal length photographing mode and a pseudo focal length photographing mode in which a printed area is smaller than that in the real focal length photographing mode. When the pseudo focal length photographing mode is selected, a printed range is indicated by the viewfinder, and information indicative of the pseudo focal length photographing mode is recorded on a film frame when it is exposed. Upon reading the information, a printer enlarges a portion (trimmed range) of the film frame and produces a print similar to one that would be produced if the focal length of the objective lens were extended.

With this arrangement, the camera is not increased in size and is inexpensive, and the performance of its photographing optical system is not lowered. The automatic focus adjustment can be effected, without any problem, in the same manner as in the real focal length photographing mode.

However, the disclosed proposal requires the production of a special camera dedicated to the aforesaid intended modes, and hence no pictures can be taken in the pseudo focal length photographing mode by commercially available cameras.

SUMMARY OF THE INVENTION

Accordingly, it is an object of the present invention to provide a camera accessory which allows a commercially available camera to take pictures in a pseudo focal length photographing mode of the type described above.

Another object of the present invention is to provide a camera accessory which allows a camera that is originally incapable of a pseudo focal length photographing mode to effect this mode.

The above objects can be achieved by a camera accessory to be used by replacing the back cover of a camera, including a means for indicating a pseudo focal length photographing mode, a means for detecting a signal related to exposure control operation of the camera, and a means responsive to the signal from the detecting means for recording information as to the pseudo focal length photographing mode on a film.

The features of the present invention, which are believed to be novel, are set forth with particularity in the appended claims. The present invention, both as its organization and manner of operation, together with further objects and advantages thereof, may be best understood by reference to the following description, taken in conjunction with the accompanying drawings.

BRIEF DESCRIPTION OF THE DRAWINGS

Before description of the present invention proceeds, it is to be noted that like parts are designated by like reference numerals throughout several views of the accompanying drawings.

DETAILED DESCRIPTION OF THE PREFERRED EMBODIMENTS

Figure 1:
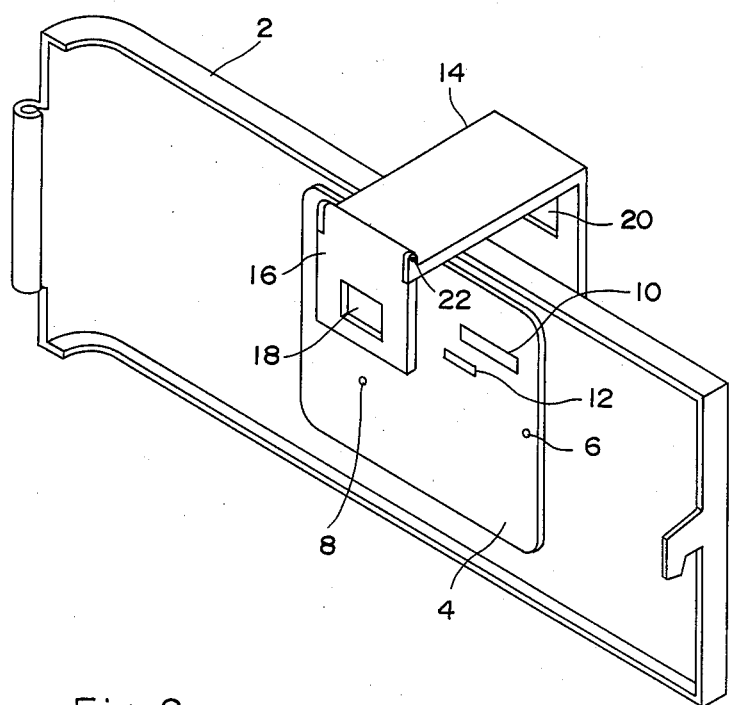
FIG. 1 is a perspective view of a camera accessory according to a first embodiment of the present invention.

FIG. 1 shows a camera accessory according to a first embodiment of the present invention. The camera accessory of the embodiment is constructed as an interchangeable back cover which can replace the back cover of a camera body. The interchangeable back cover, generally designated by the reference numeral 2, has a pressure plate 4 for pressing a film against the image frame of the camera body, a recorder 6 for recording a signal indicative of a pseudo focal length photographing mode (trimming) around a film frame located in an exposure position, a light receiver 8 for generating a recording signal in response to light that has passed through the film when the shutter is released, a date recorder 10 for recording the date on a film frame within its exposure range when a real focal length photographing mode is selected, and another date recorder 12 for recording the date on a film frame within its exposure range when the pseudo focal length photographing mode is selected. The interchangeable back cover 2 also includes a viewfinder frame holder 14 which projects upwardly from the camera body when the back cover 2 is mounted on the camera body, and a viewfinder frame 16 angularly movably mounted on the viewfinder frame holder 14 by means of a hinge 22. An object-side opening 18 is provided with the viewfinder frame 16, and with the viewfinder frame holder 14 an eyepiece-side opening 20 is provided.

Figure 2:
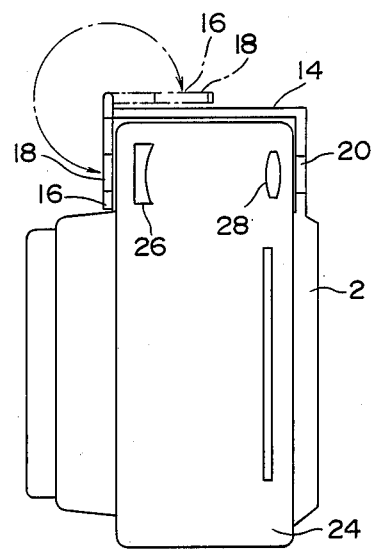
FIG. 2 is a vertical cross-sectional view of the camera accessory as mounted on a camera.

For taking a picture in the pseudo focal length photographing mode using the interchangeable back cover 2 of the first embodiment, the back cover of the camera body is replaced with the interchangeable back cover 2 as shown in FIG. 2. In FIG. 2, the camera body, denoted at 24, houses therein a viewfinder objective lens 26 and a viewfinder eyepiece lens 28. The interchangeable back cover 2 is attached such that its viewfinder frame holder 14 lies along the upper surface of the camera body 24. With the interchangeable back cover 2 thus mounted in position, the eyepiece-side opening 20 is positioned in a viewfinder light path. When the pseudo focal length photographing mode is selected as indicated by the solid lines in FIG. 2, the object-side opening 18 of the viewfinder frame 16 is also positioned in the viewfinder light path to limit the finder field (the field to be observed by the viewfinder) to a print range that is used in the pseudo focal length photographing mode. In the real focal length photographing mode, the viewfinder frame 16 is angularly moved clockwise approximately 270° about the hinge 22 out of the viewfinder light path into the dot-and-dash-line position.

A switch (described later) actuatable in response to the angular movement of the viewfinder frame 16 controls whether the signal indicative of the pseudo focal length photographing mode is printed or not. Alternatively, a manually operable changeover switch for indicating whether the signal indicative of the pseudo focal length photographing mode is printed or not may be disposed on the back cover. Although the finder field is defined by the object-side opening 18 in the pseudo focal length photographing mode in the illustrated embodiment, the object-side opening 18 may be made larger than the view-finder light path in the real focal length photographing mode, and a transmission-type liquid crystal display unit may be fitted in the object-side opening 18 for electrically changing the finder field between the pseudo focal length photographing mode and the real focal length photographing mode.

Figure 3:
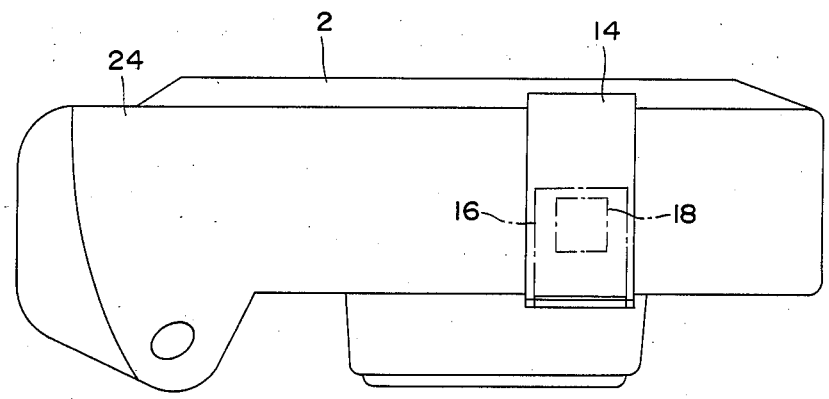
FIG. 3 is plan view of the camera accessory on the camera.
Figure 4:
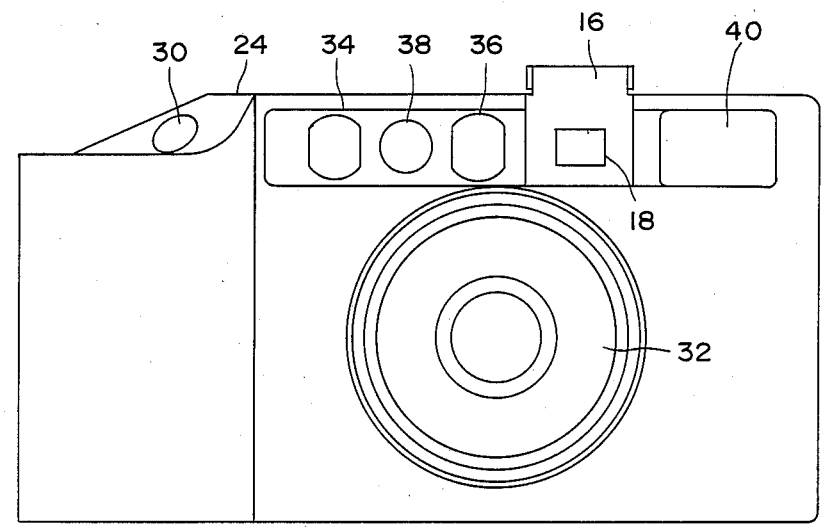
FIG. 4 is a front elevational view of the camera accessory on the camera.

FIGS. 3 and 4 show the condition when the pseudo focal length photographing mode is selected. Therefore, the object-side opening 18 of the viewfinder frame 16 is positioned in the viewfinder light path to limit the finder field FIG. 3 also shows in dot-and-dash lines the position of the viewfinder frame 16 and the object-side opening 18 in the real focal length photographing mode. As shown in FIG. 4, the camera body 24 has a shutter release button 30, an objective lens 32, known rangefinder windows including a light-emitting window 34 for emitting infrared light and a light detector window 36 for detecting reflected light to measure the distance up to an object to be photographed, a viewfinder lighting window 38, and an electronic flash light-emitting unit 40.

Figure 5:
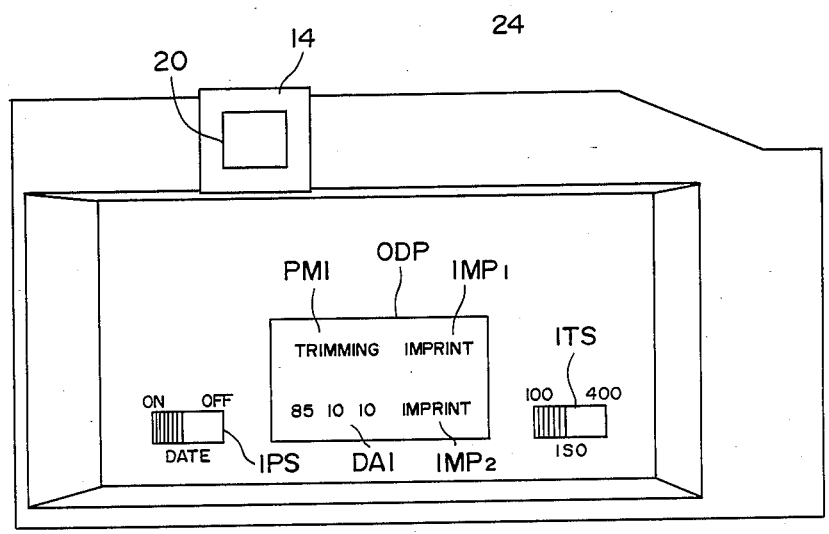
FIG. 5 is a rear elevational view of the camera accessory on the camera.

FIG. 5 shows the rear side of the interchangeable back cover 2. The rear side of the interchangeable back cover 2 has a date recording selector switch IPS which can be manually shifted to a position "ON" when date recording is selected, and a film sensitivity selector switch ITS which can be manually shifted to a position "400" when the sensitivity of the loaded film is ISO 400 or more and to a position "100" when the sensitivity of the loaded film is ISO 100 or below. The rear side of the interchangeable back cover 2 also has a liquid crystal display unit ODP including a date display DAI for displaying the date data (date) to be recorded, a photographing mode display PMI for displaying whether the photographing mode is the real focal length photographing mode or the pseudo focal length photographing mode, a date recording completion display $IMP_2$ for displaying the completion of the date recording, and a signal recording completion display $IMP_1$ for displaying the completion of the signal indicative of the pseudo focal length photographing mode. The date display DAI is energized only when the date recording is selected, and the photographing mode display PMI is energized only when the pseudo focal length photographing mode is selected. The date recording completion display $IMP_2$ and the signal recording completion display $IMP_1$ are energized for a preset period of time after the date and the signal, respectively, have been recorded.

Figure 6:
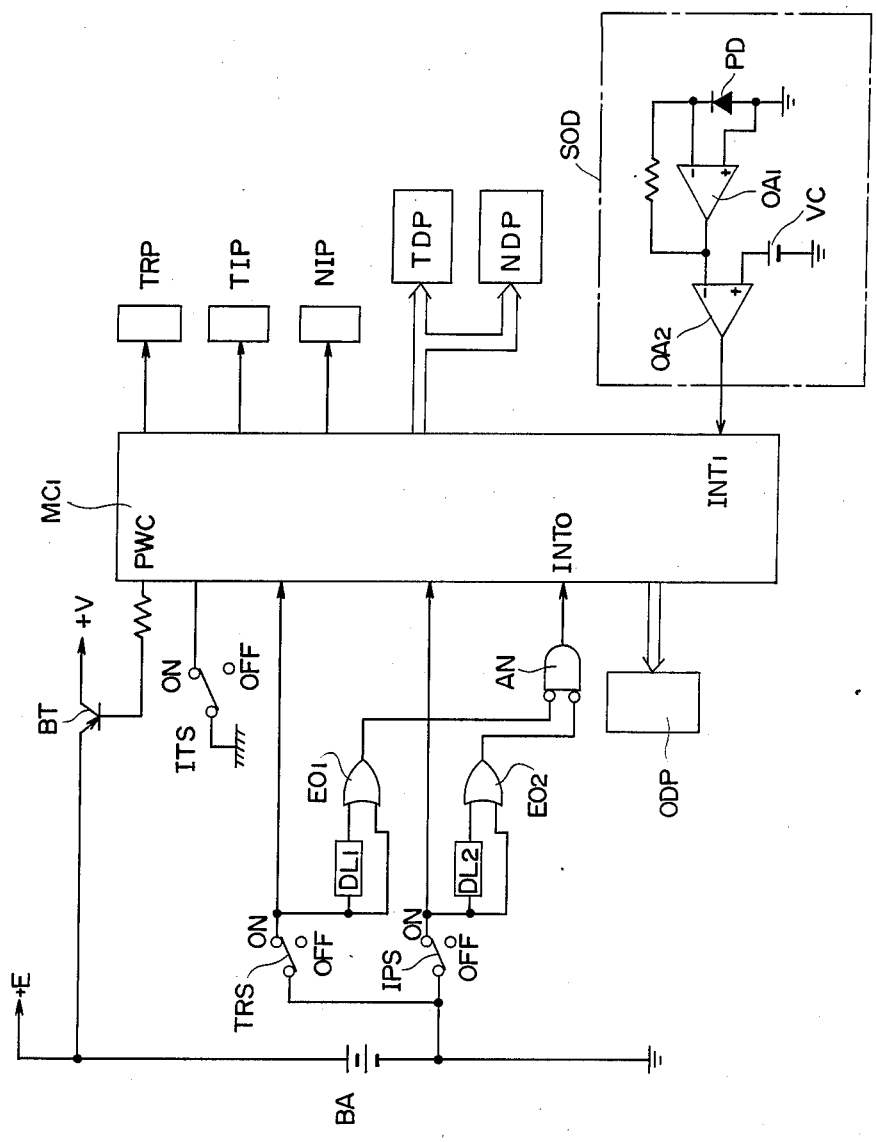
FIG. 6 is a circuit diagram, partly in block form, of an electric circuit on the camera accessory.

FIG. 6 shows an electric circuit in the interchangeable back cover 2 of the first embodiment. The electric circuit includes the date recording selector switch IPS shown in FIG. 5, and a photographing mode selector switch TRS interlinked with the viewfinder frame 16 (not shown). The photographing mode selector switch TRS is turned ON when the viewfinder frame 16 is positioned in the viewfinder light path and turned OFF when the viewfinder frame 16 is retracted from the viewfinder light path.

Delay circuits $DL_1$, $DL_2$ and exclusive-OR gates $EO_1$, $EO_2$ jointly constitute one-shot circuits which generate "H" pulses when any of the switches IPS and TRS is changed from the ON state to the OFF state or vice versa. The "H" pules from the one-shot circuits are converted by an AND gate AN to an "L" pulse, which is applied to an interrupt terminal $INT_0$ of a microcomputer $MC_1$ which controls operation of the interchangeable back cover 2.

A film sensitivity selector switch ITS is interlinked with the film sensitivity selector switch ITS shown in FIG. 5 and is manually shifted to a position "ON" when the film in use has a high sensitivity (ISO 400 or more) and to a position "OFF" when the film in use has a low sensitivity (ISO 100 or less). The electric circuit includes the liquid crystal display unit ODP disposed on the rear side of the back cover as shown in FIG. 5.

A light source TRP is used for recording the signal indicative of the pseudo focal length photographing mode on a film. A light source TIP is used with the date recorder 12 for recording the date when the pseudo focal length photographing mode is selected, and a light source NIP is used with the date recorder 10 for recording the date when the real focal length photographing mode is selected.

A liquid crystal display unit TDP serves to display the date to be recorded by the date recorder 12, and a liquid crystal display unit NDP serves to display the date to be recorded by the date recorder 10. The display units TDP, NDP display the same data (numerals).

A light detector PD corresponds to the light detector 8 illustrated in FIG. 1. An output from the light detector PD is amplified by an operational amplifier $OA_1$, which in turn produces a voltage proportional to the intensity of the light detected by the light detector PD. When the camera shutter starts being released or opened, light that has passed through the film falls on the light detector PD and the intensity of the light falling thereon is increased. When the output from the operational amplifier $OA_1$ exceeds the output from a constant voltage source VC, the output from an operational amplifier $OA_2$ is inverted into an "L" level, which is applied as an interrupt signal to an interrupt terminal $INT_l$ of the microcomputer $MC_1$. The light detector PD and the operational amplifiers $OA_1$, $OA_2$ jointly constitute a shutter opening detector circuit SOD that is energized by a battery BA through a power supply line $+V$ via a transistor BT which is controllably turned ON or OFF by an output terminal PWC of the microcomputer $MC_1$. The other circuits are energized directly by the battery BA via a power supply line $+E$.

Figure 7:
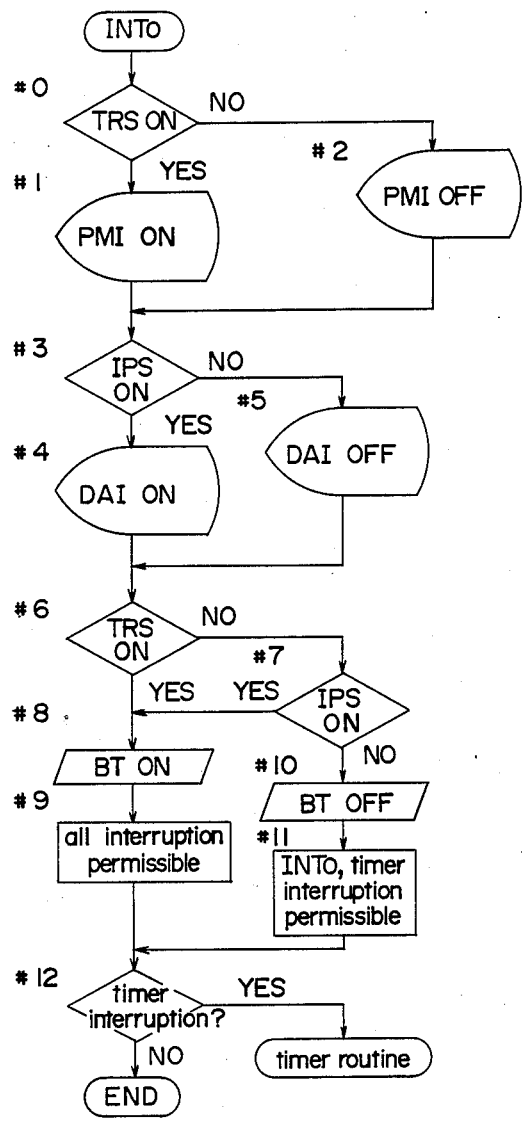
FIGS. 7, 8 and 9 are flowcharts of operation of the electric circuit.

FIG. 7 shows a flowchart of an operation sequence of the microcomputer $MC_1$. A process initiated by applying an interrupt signal to the intefrupt terminal $INT_0$ of the microcomputer $MC_1$ through operation of either the photographing mode selector switch TRS or the date recording selector switch IPS will first be described.

A step #0 ascertains whether the photographing mode selector switch TRS is turned ON or not. If turned ON, then control proceeds to a step #1 in which the photographing mode display PMI is energized on the liquid crystal display unit ODP to indicate the pseudo focal length photographing mode. If the photographing mode selector switch TRS is turned OFF in the step #0, then the photographing mode display PMI is de-enrgized on the liquid crystal display unit ODP in a step #2.

Thereafter, a step #3 ascertains whether the date recording selector switch IPS is turned ON or not. If turned ON, the date to be recorded is displayed on the date display DAI of the liquid crystal display unit ODF in a step #4. If the date recording selector switch IPS is turned OFF, then the date display DAI is de-energized in a step #5.

Then, steps #6, #7 ascertain whether at least one of the photographing mode selector switch TRS and the date recording selector switch IPS is turned ON or not. If any one of these switches is turned ON, the transistor BT is energized in a step #8 to supply electric power to the shutter opening detector circuit SOD, followed by a step #9 in which interrupts from the interrupt terminals $INT_0$, $INT_1$ and a timer interruption (described later) are permitted. Then, control goes from the step #9 to a step #12.

If both of the switches TRS, IPS are turned OFF in the steps #6, #7, control goes to a step #10 in which the transistor BT is turned OFF to de-energize the shutter opening detector circuit SOD, and then to a step #11 in which an interrupt from the interrupt terminal $INT_0$ and a timer interrupt are permitted. Control then goes to the step #12.

Figure 9:
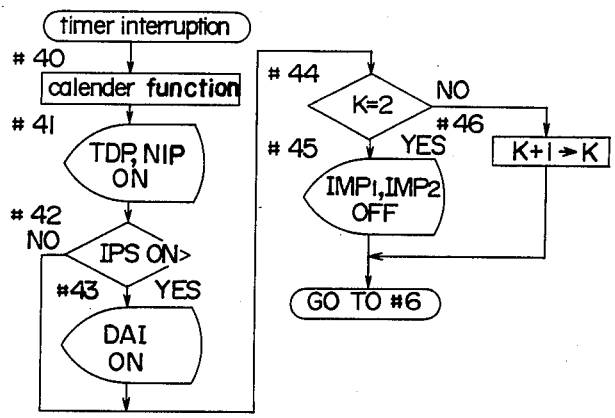

The step #12 ascertains whether a timer interruption, which is produced every second, is inputted or not during a time period from an input of interruption in the interrupt terminal $INT_0$ or $INT_1$ to the step #12. If there is a timer interruption, then control jumps to a timer routine shown in FIG. 9. If there is no timer interruption, then the operation sequence is ended.

Figure 8:
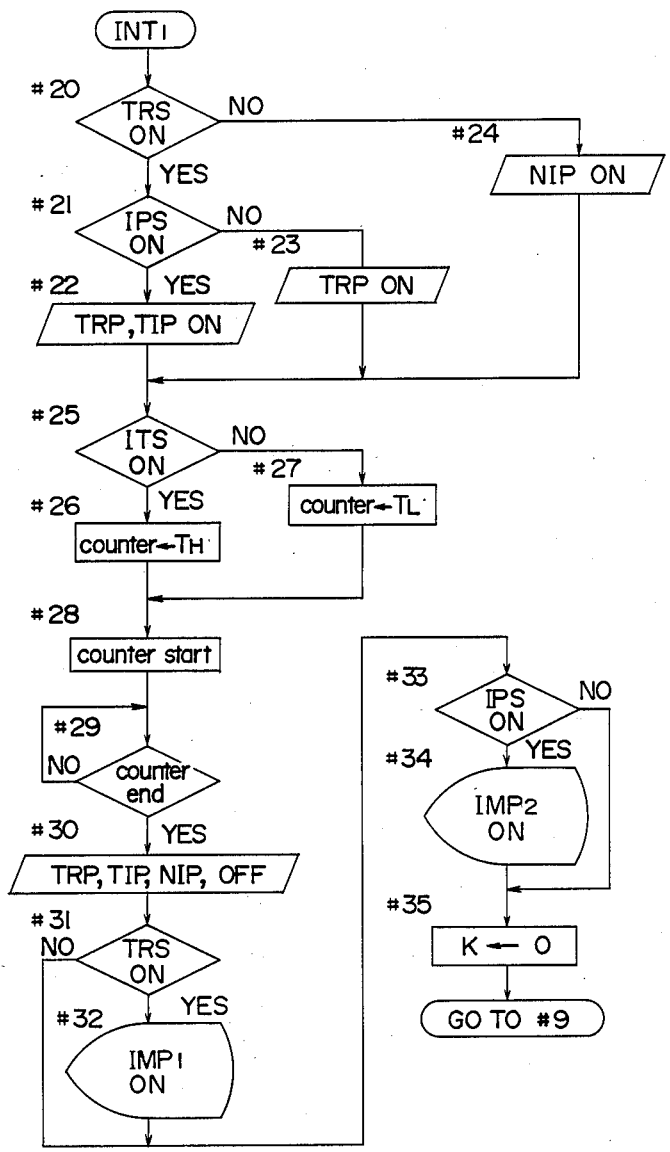

Now, at least one of the pseudo focal length photographing mode and the date recording mode is selected and an interrupt signal from the interrupt terminal $INT_1$ is received. Under this condition, the shutter opening detector circuit SOD detects light that has passed through the film upon releasing of the shutter, and an interrupt signal is applied to the interrupt terminal $INT_1$ of the microcomputer $MC_1$. Operation initiated by such a procedure will be described below with reference to FIG. 8.

The date recording selector switch IPS and the photographing mode selector switch TRS are checked in steps #20, #21, respectively. If both of the switches are turned ON, then control goes to a step #22 which energizes the light source TRP for recording the signal indicative of the pseudo focal length photographing mode and the light source TIP for recording the date in the pseudo focal length photographing mode, followed by a step #25. If only the photographing mode selector switch TRS is turned ON in the step #20, then the light source TRP is energized in a step #23, followed by the step #25. If only the date recording selector switch IPS is turned ON, the light source NIP for recording the date in the real focal length photographing mode is energized in a step #24, followed by the step #25.

The step #25 ascertains whether the film sensitivity selector switch ITS is turned ON or not. If the film sensitivity selector switch ITS is turned ON with a high-sensitivity film loaded, then a prescribed value "TH"is set in a counter in the microcomputer $MC_1$ in a step #26. If the film sensitivity selector switch ITS is turned OFF with a low-sensitivity film loaded, a prescribed value "TL" is set in the counter in a step #27 (TH <TL). This is to set a recording time dependent on the film sensitivity.

The counter starts its counting operation in a step #28. If the completion of the counting operation of the counter is detected in a step. #29, then all of the light sources TRP, TIP, NIP are de-energized in a step #30 to finish the recording process.

Then, control goes to a step #31 which checks the photographing mode selector switch TRS. If the switch TRS is turned ON, then the signal recording completion display $IMP_1$ is energized on the liquid crystal display unit ODP in a step #32. The step #32 is followed by a step #33 which checks the date recording selector switch IPS. If this switch IPS is turned ON in the step #33, then the date recording completion display $IMP_2$ is energized on the liquid crystal display unit ODP in a step #34. Thereafter, a register K in the microcomputer $MC_1$ is reset to "0" in a step #35, and then control goes to the step #9 in FIG. 7.

A timer in the microcomputer $MC_l$ allows a timer interruption to be applied every second to enable the microcomputer to effect a calender function. This process will be described with reference to FIG. 9. When a timer interruption occurs, data on the second, minute, hours, date, month, and year are incremented in a step #40, and the date, month, and year are displayed on the liquid crystal display units TDP, NIP. Then, the date recording selector switch IPS is checked in a step #42. If the date recording selector switch IPS is turned ON, then the date, month, and year are also displayed on the data display DAI of the liquid crystal display unit ODP for external representation of the data.

A step #44 then determines whether the data in the register K is "2" or not. If "2", then the recording completion displays $IMP_1$, $IMP_2$ are de-energized, and control goes to the step #6 in FIG. 7. If not "2" in the step #44, then control proceeds to a step #46 in which "1" is added to the data in the register K, and the recording completion displays $IMP_1$, $IMP_2$ remain energized. Then, control goes to the step #6 in FIG. 7. Therefore, the register K is provided for controlling the time period for which the recording completion displays $IMP_1$, $IMP_2$ are energized for display. In the embodiment, a timer interruption occurs every second to add "1" to the register K, and when the register K reaches "2", the recording completion displays $IMP_1$, $IMP_2$ are de-energized. Thus, the recording completion displays $IMP_1$, $IMP_2$ are energized for two seconds.

Figure 10:
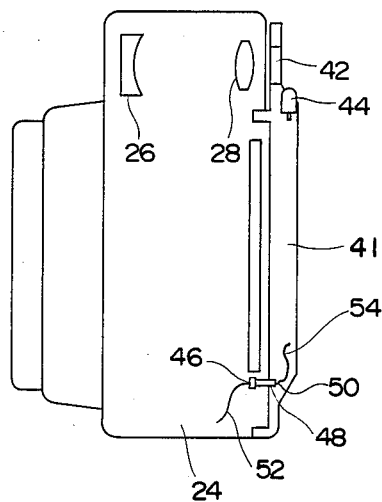
FIG. 10 is a vertical cross-sectional view showing a second embodiment of the present invention.

FIG. 10 shows an interchangeable back cover according to a second embodiment that is a modification of the first embodiment, the interchangeable back cover being mounted on a camera body in place of its ordinary back cover. Those parts in FIG. 10 which are identical to those shown in FIG. 2 are denoted by identical reference numerals, and will not be described in detail. An interchangeable back cover 41 has a lamp 44 for indicating the pseudo focal length photographing mode, the lamp 44 being disposed below an eyepiece frame 42. In the pseudo focal length photographing mode, the lamp 44 is energized to apprise the user of this mode. When the camera is used in the pseudo focal length photographing mode at all times with this interchangeable back cover 40 mounted in place of the ordinary back cover, a color filter may be fitted in the eyepiece frame 42 for user's convenience.

The viewfinder frame for indicating a photographing range may be constructed by incorporating a known field-frame display optical system of the Albada type or lighting type in the viewfinder optical system within the camera body 24, such that two field frames for a pseudo focal length photographing mode and a real focal length photographing mode may selectively be displayed dependent on the selected photographing mode.

A data recording terminal 46 is provided on the camera body 24 for issuing a date recording starting signal indicative of date recording timing determined in the camera body 24. A signal pin 48 is provided on the back cover 41 for receiving the date recording starting signal. The signal pin 48 is resiliently pressed by a spring 50 into engagement with the date recording terminal 46. A lead wire 52 coupled to the date recording terminal 46 is connected to an electric circuit in the camera body 24. Another lead wire 54 coupled to the signal pin 50 is connected to the microcomputer $MC_1$ in the interchangeable back cover 41.

When the interchangeable back cover 41 is mounted on the camera body 24, the date recording starting signal from the camera body 24 is received by the electric circuit in the back cover 41 to control the signal representative of the pseudo focal length photographing mode and the date recording timing.

Figure 11:
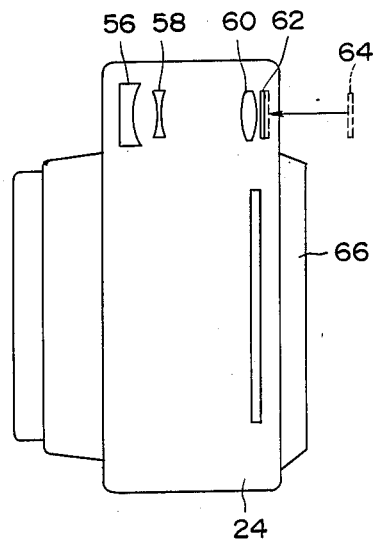
FIG. 11 is a vertical cross-sectional view showing a third embodiment of the present invention.

According to a third embodiment illustrated in FIG. 11, an interchangeable back cover is mounted on a camera having an Albada viewfinder optical system. The Albada viewfinder optical system provided in the camera body 24 comprises, in order from an object side, an objective lens 56, a frame reflecting mirror 58 with an image-side surface being a frame reflecting surface, an eyepiece lens 60, and a frame plate 62 to which a field frame indicating a photographing range is applied by vapor deposition. A frame plate 64 for use in the pseudo focal length photographing mode is detachably mounted on the viewfinder eyepiece. The photographing range in the real focal length photographing mode is indicated in the viewfinder by the Albada viewfinder optical system thus assembled in the camera body 24.

When the interchangeable back cover 66 constructed to allow pictures to be taken in the pseudo focal length photographing mode at all times is mounted on the camera body 24, the frame plate 64 is attached to the camera body 24 in intimate contact with the frame plate 62. On the object-side surface of the frame plate 64, there is coated, by vapor deposition, a frame for indicating a range to be printed in the pseudo focal length photographing mode to allow the user to effect suitable framing dependent on the pseudo focal length photographing mode.

Figure 12:
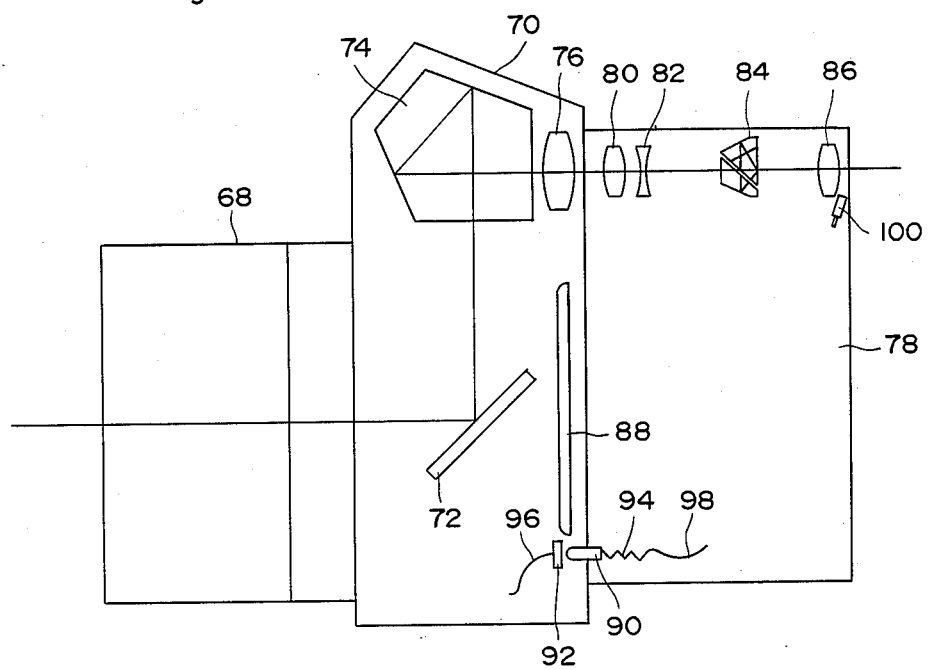
FIG. 12 is vertical cross-sectional view showing a fourth embodiment of the present invention which is incorporated in an interchangeable back cover of a single-lens reflex camera.

FIG. 12 illustrates a fourth embodiment of the present invention, in which an interchangeable back cover of a single-lens reflex camera with an interchangeable lens is capable of recording a signal indicative of the pseudo focal length photographing mode. As shown in FIG. 12, an interchangeable objective lens 68 is mounted on a camera body 70 housing therein a main mirror 72, a pentagonal dach prism 74, and an eyepiece lens 76. An interchangeable back cover 78 according to this embodiment is mounted on the camera body 70 in place of an ordinary back cover. The interchangeable back cover 78 houses therein a viewfinder optical system comprising viewfinder zoom lenses 80, 82 for changing the image magnification of the viewfinder, a Schmidt prism 84, and an eyepiece lens 86.

When the interchangeable back cover 78 is mounted on the camera body 70, the viewfinder optical system in the interchangeable back cover 78 is disposed behind the eyepiece lens 76 in the camera body 70.

The zoom lenses 80, 82 serve to make the image magnification of the viewfinder greater than that in the real focal length photographing mode when the pseudo focal length photographing mode is selected on the interchangeable back cover 78. The Schmidt prism 84 for inverting an image is composed of two prisms. The viewfinder optical system includes a field mask positioned between the two prisms of the Schmidt prism 84.

A film pressure plate 88 is supported by the interchangeable back cover 78. A signal pin 90 is provided on the interchangeable back cover 78 for receiving a signal from a signal terminal 92 in the camera body 70 to print the signal indicative of the pseudo focal length photographing mode and the date on a film frame. The signal pin 90 is resiliently pressed by a spring 94 against the signal terminal 92. Lead wires 96, 98 are connected to the signal terminal 92 and the signal pin 90, respectively. A light-emitting diode 100 for indicating the pseudo focal length photographing mode is energized when the pseudo focal length photographing mode is selected.

In this embodiment, a range to be printed in the pseudo focal length photographing mode is observed through the zoom viewfinder. However, rather than the zoom viewfinder, a frame representing a range to be printed may be disposed on a focusing screen in the camera body for permitting accurate framing in the pseudo focal length photographing mode. Where an exposure processing circuit is included in the interchangeable back cover 78, photometric information may be received from the signal terminal 92 in the camera body 70, appropriate exposure calculation may be effected on the basis of the photometric information in the interchangeable back cover 78 when in the pseudo focal length photographing mode, and then the result of the exposure calculation may be delivered back to the camera body 70 via the signal terminal 92 for exposure control. The viewfinder optical system in the interchangeable back cover 78 is of the real-image type in the illustrated embodiment, but it may be of the virtual-image type.

Figure 13:
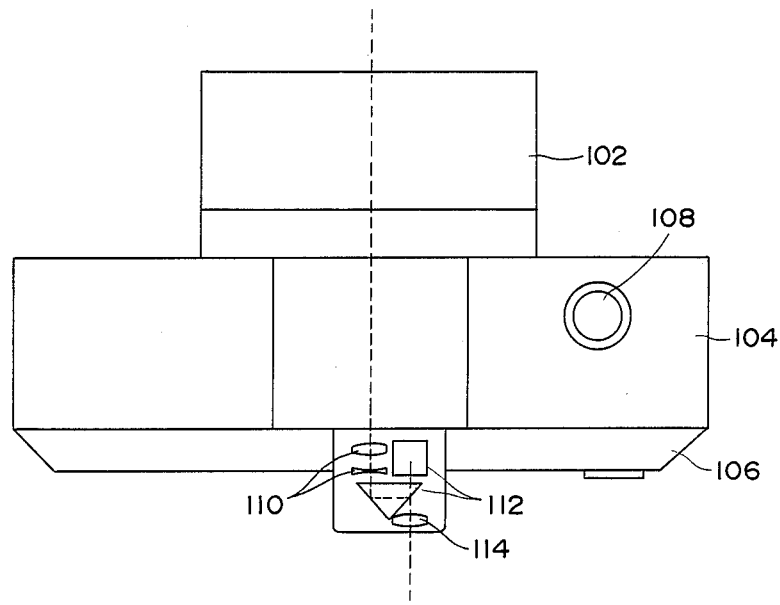
FIG. 13 is a plan view illustrating a fifth embodiment of the present invention.

FIG. 13 is illustrative of a fifth embodiment in which the present invention is applied to an interchangeable back cover of a single-lens reflex camera. An objective lens 102 is mounted on a camera body 104 with an interchangeable back cover 106 of the embodiment which is disposed in place of an ordinary back cover. A shutter release button 108 is disposed on the camera body 104. The interchangeable back cover 106 houses therein a viewfinder optical system comprising viewfinder zoom lenses 110, Porro prism 112 for inverting an image, and an eyepiece lens 114.

Figure 14:
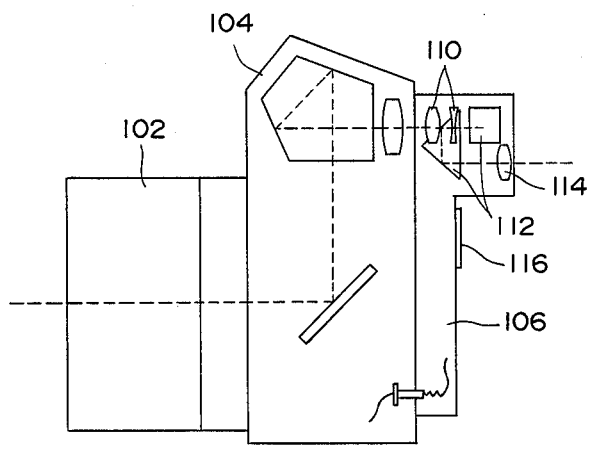
FIG. 14 is a vertical cross-sectional view of the fifth embodiment.

As shown in the vertical cross section of FIG. 14, a photographing mode selector switch 116 mounted on the interchangeable back cover 106 is manually operable to select the pseudo focal length photographing mode or not. In response to the operation of this switch 116, the distance between the viewfinder zoom lenses 110 is varied to change the viewfinder magnification.

Figure 15:
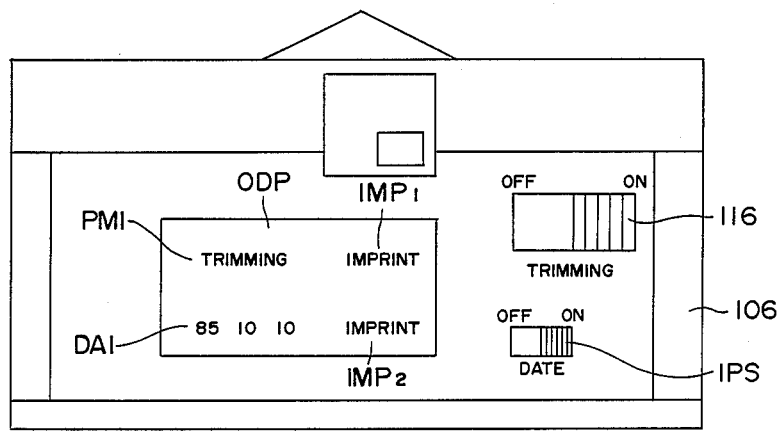
FIG. 15 is a rear elevational view of the fifth embodiment.

The rear side of the interchangeable back cover 106 is illustrated in FIG. 15. Those components shown in FIG. 15 which are identical to those of the first embodiment (FIG. 5) are denoted by identical reference characters, and will not be described in detail. The photographing mode selector switch 116 is shown.

Figure 16:
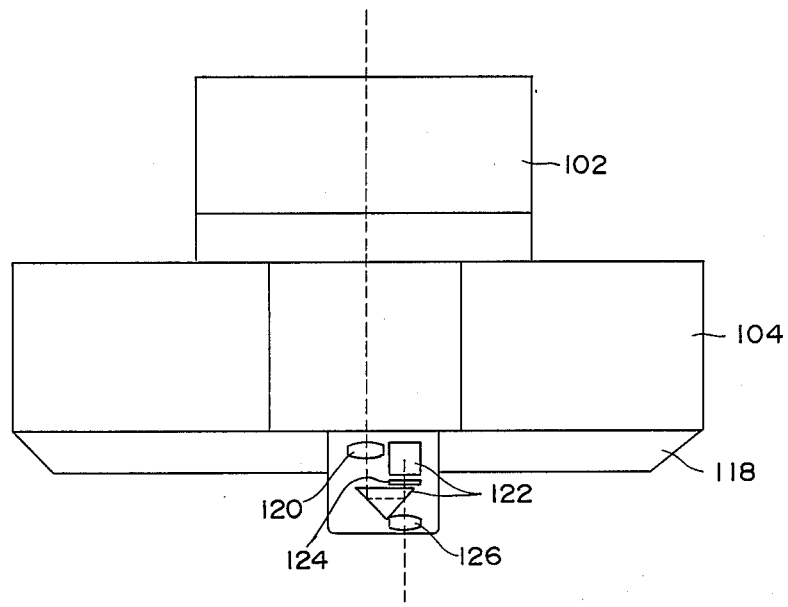
FIG. 16 is a plan view illustrating a sixth embodiment of the present invention.
Figure 17:
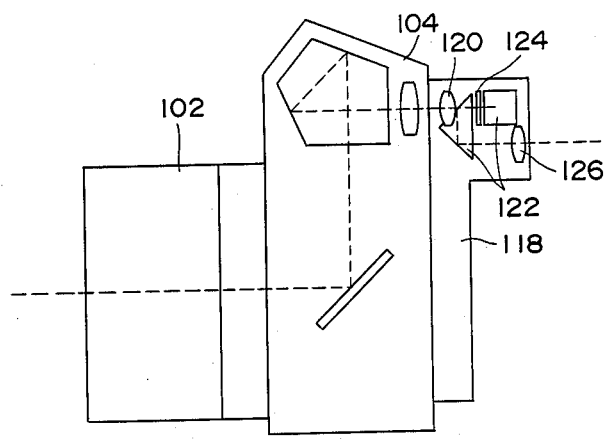
FIG. 17 is a vertical cross-sectional view of the sixth embodiment.

FIG. 16 shows a sixth embodiment of the present invention, in which the present invention is applied to an interchangeable back cover of a single-lens reflex camera. Those components shown in FIG. 16 which are identical to those shown in FIG. 13 are denoted by identical reference characters, and will not be described in detail. In FIG. 16, an interchangeable back cover 118 of the sixth embodiment houses therein a real-image-type viewfinder optical system composed of an objective lens 120, prism 122 for inverting an image, a liquid crystal display unit 124 for displaying a field frame, and an eyepiece lens 126. The real-image-type viewfinder optical system is shown in vertical cross section in FIG. 17.

Figure 18:
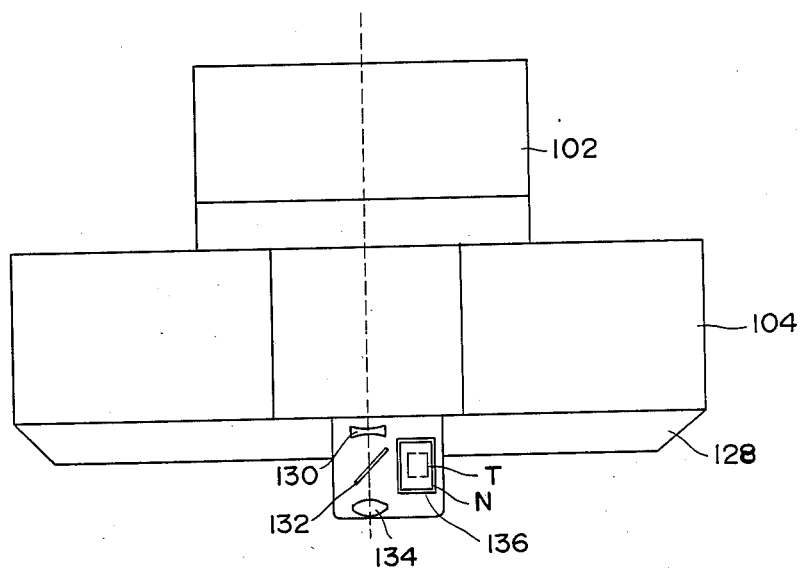
FIG. 18 a plan view illustrating a seventh embodiment of the present invention.
Figure 19:
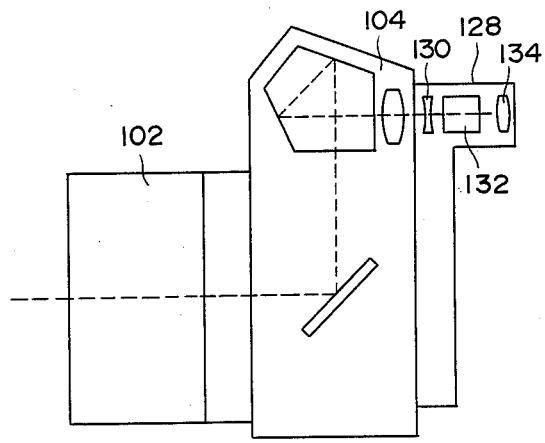
FIG. 19 is a vertical cross-sectional view of the seventh embodiment.
Figure 20:
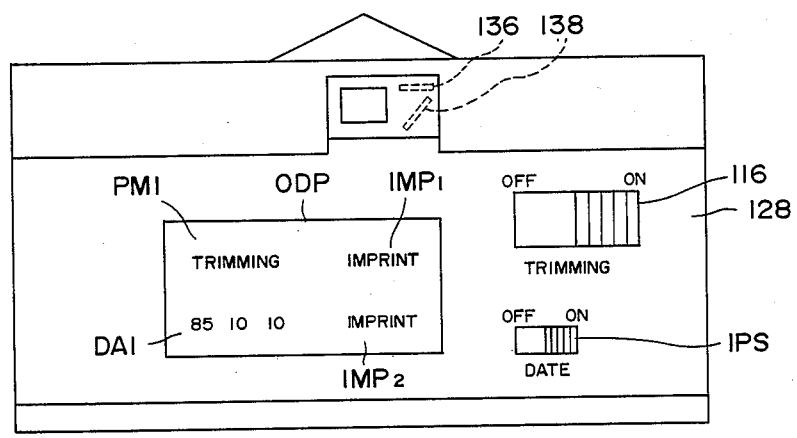
FIG. 20 is a rear elevational view of the seventh embodiment.

According to a seventh embodiment shown in FIG. 18, the present invention is also applied to an interchangeable back cover of a single-lens reflex camera. Those components shown in FIG. 18 which are identical to those shown in FIG. 13 are denoted by identical reference characters, and will not be described in detail. As shown in FIGS. 18 and 19, an interchangeable back cover 128 houses a viewfinder optical system composed of an objective lens 130, a half mirror 132, and an eyepiece lens 134. As illustrated in FIG. 20, a liquid crystal display unit 136 for selectively displaying two field frames N, T (FIG. 18) dependent on the selected photographing mode is disposed laterally of the half mirror 132. A mirror 138 for reflecting light from the liquid crystal display unit 136 toward the half mirror 132 is also disposed laterally of the half mirror 132.

Figure 21:
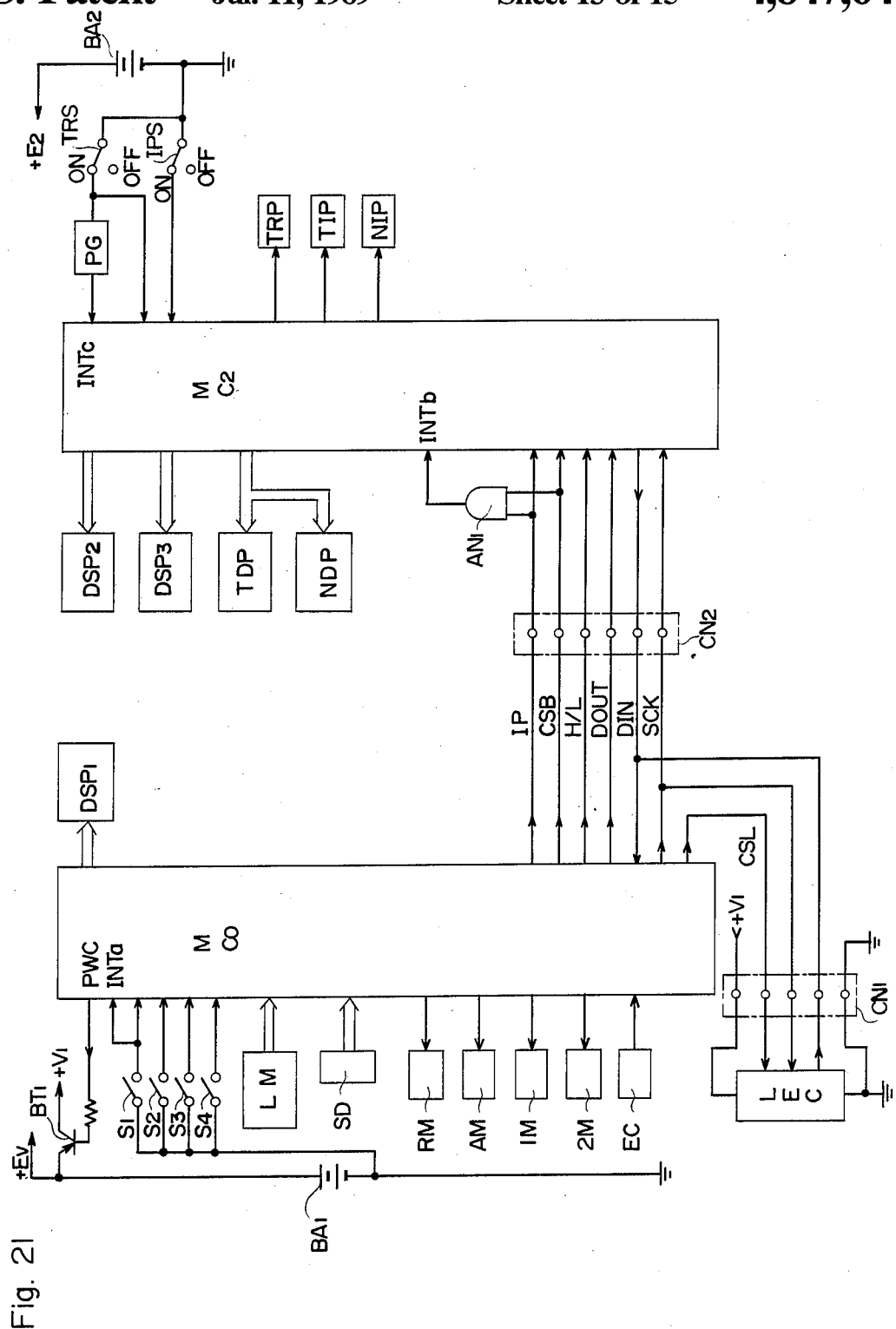
FIG. 21 is a circuit diagram, partly in block form, of electric circuits in a camera body and a back cover according to each of the fifth through seventh embodiments.

FIG. 21 shows an electric circuit for each of the fifth, sixth, and seventh embodiments shown in FIGS. 13 through 20, incorporated in the interchangeable back covers of single-lens reflex cameras. In FIG. 21, a lens circuit LEC is disposed in an objective lens for producing various signals dependent on the objective lens through a connector $CN_1$ to a microcomputer $MC_0$ in the camera body. The lens circuit LEC is energized by a battery $BA_1$ in the camera body through a power supply line $+V_1$ controlled by a transistor $BT_1$ which is rendered conductive when an output terminal PWC of the microcomputer $MC_o$ goes high in level.

The electric circuit also includes a photometric circuit LM for measuring the brightness of an object to be photographed, and a film sensitivity selector circuit SD for producing a film sensitivity signal indicative of the film sensitivity of a film to be exposed, these circuits LM, SD being energized by the battery $BA_1$ via the power supply line $+V_1$.

A photometric switch $S_1$ is closed by depressing the shutter release button to a first step, and a release switch $S_2$ is closed by depressing the shutter release button to a second step. The photometric circuit LM is operated by closing the photometric switch $S_1$. A mirror switch $S_3$ is closed upon completion of upward movement of the main mirror 72 of the single-lens reflex camera, and is opened upon completion of downward movement of the main mirror 72. A shutter switch $S_4$ is closed upon completion of travel of a second curtain of the focal plane shutter and opened by the charging of the shutter. In response to the closing of the photometric switch $S_1$, an interrupt signal is applied to an interrupt terminal INTa of the microcomputer $MC_0$.

A release circuit RM starts stopping down the aperture of the objective lens to begin exposure control operation. The aperture of the objective lens is controlled by an aperture control circuit AM. A first-curtain control circuit 1M controls a first curtain of the shutter. The second curtain of the shutter is controlled by a second curtain control circuit 2M. These circuits RM, AM, 1M, 2M are controlled by the microcomputer $MC_0$.

The amount to which the aperture of the objective lens has been stopped down is monitored and transmitted by an encoder EC to the microcomputer $MC_0$. A display circuit $DSP_1$ serves to display the shutter speed and the aperture value on the camera body.

The microcomputer $MC_O$ in the camera body is connected by a connector $CN_2$ to a microcomputer $MC_2$ disposed in the back cover. Various signals are delivered from the microcomputer $MC_0$ in the camera body to the microcomputer $M_2$ in the back cover through respective terminals IP, CSB, H/L, DOUT, and SCK. A signal is transmitted from the microcomputer $MC_2$ in the back cover to the microcomputer $MC_0$ in the camera body through a terminal DIN.

The signals which are transmitted through the above various terminals are described below. The terminal IP delivers an "L" pulse from the microcomputer $MC_0$ to enable the back cover to start recording the signal indicative of the pseudo focal length photographing mode and the date. The terminal CSB goes "L" level when data is transmitted between the microcomputer $MC_0$ in the camera body and the microcomputer $MC_2$ in the back cover. When the terminal H/L is "H" in level, the microcomputer $MC_0$ outputs signals, and when the terminal H/L is "L" in level, the microcomputer $MC_2$ outputs data. The terminal DOUT is a serial bus for data transmission from the microcomputer $MC_0$ to the microcomputer $MC_2$. The terminal DIN is a serial data bus for data transmission from the microcomputer $MC_2$ and the lens circuit LEC to the microcomputer $MC_0$. The terminal SCK is an output terminal for producing synchronizing clock pulses that are generated for serial data transmission from the microcomputer $MC_0$ to the microcomputer $MC_2$ and the lens circuit LEC. A terminal CSL is a terminal which goes "L" in level when data is applied from the lens circuit LEC to the microcomputer $MC_0$.

To the microcomputer $MC_2$, there are connected various circuits, and those circuits which are identical to those shown in FIG. 6 are denoted by identical reference characters, and will not be described in detail. However, the circuit arrangement shown in FIG. 6 which includes the one-shot circuit composed of the delay circuit $DL_1$ and the exclusive-OR gate $EO_1$ and the inverter coupled to the output terminal of the one-shot circuit is indicated as a pulse generator PG in FIG. 21. A liquid crystal display unit $DSP_2$ externally displays information indicating whether the camera is in the pseudo focal length photographing mode or not. This liquid crystal display unit $DSP_2$ corresponds to the display unit ODP shown in FIGS. 5, 15 and 20. The above information is displayed in the viewfinder by means of a liquid crystal display unit $DSP_3$.

Operation of the microcomputer $MC_0$ will be described with reference to FIG. 22. When the photometric switch $S_1$(shown in FIG. 21) is closed by depressing the shutter release button to the first step, an interrupt signal is applied to the interrupt terminal INTa of the microcomputer $MC_0$, starting the operation sequence from a step #50 in FIG. 22. In the step #50, the terminal PWC of the microcomputer $MC_0$ goes high to render the transistor $BT_1$ conductive to energize the lens circuit LEC through the power supply line +V1.

In a step #51, various data items inherent in the lens, such as minimum F-number Avo, maximum F-number Avmax, and focal length f, are delivered from the lens circuit LEC via the serial data bus DIN to the microcomputer $MC_0$. The step #51 is followed by a step #52 in which a film sensitivity signal Sv is supplied from the film sensitivity selector circuit SD to the microcomputer $MC_0$. Then, a brightness signal Bv commensurate with the brightness of the object is applied from the photometric circuit LM to the microcomputer $MC_0$ in a step #53. The terminal CSB is rendered "L" in a step #54 in readiness for data transmission between the microcomputers $MC_0$, $MC_2$. Then, the terminal H/L is rendered "H" in a step #55 to set a mode for enabling the microcomputer $MC_0$ to produce data. In a next step #56, various processing data items such as minimum F-number Avo, maximum F-number Avmax, longest shutter speed Tvo, shortest shutter speed Tvmax, film sensitivity Sv, TTL exposure measurement at open aperture Bv - Avo, and focal length f, are delivered from the microcomputer $MC_o$ to the microcomputer $MC_2$ through the serial data bus DOUT. The terminal H/L is rendered "L" in a step #57 to set a mode for delivery of data from the microcomputer $MC_2$ to the microcomputer $MC_0$. Then, data BCD indicative of whether the interchangeable back cover is properly mounted on the camera body is fed from the microcomputer $MC_2$ to the microcomputer $MC_0$.

Based on this data BCD, a step #59 determines whether the interchangeable back cover is properly mounted or not. If mounted, then control proceeds to a step #60 in which the elapse of a certain period of time required to effect exposure calculation in the back cover is awaited. Thereafter, proper aperture value Av and proper shutter speed value Tv calculated in the back cover are read out in a step #61, and the terminal CSB is rendered "H" in a step #62.

If the back cover is not mounted on the camera body in the step #59, then steps #63, #64 ascertain, from the signal of focal length f from the lens circuit LEC, whether the mounted objective lens is of a short focal length range, a long focal length range, or a medium focal length range. Based on the result of each of these decision steps, calculation is effected according to different programs corresponding to the focal length ranges in respective steps #65, #66, #67, and the terminal CSB is rendered "H"in a step #68. More specifically, where the objective lens is a lens having a focal length within the short focal length range, exposure calculation is carried out in the step #65 according to a program Pw that is predetermined properly to the short-focal-length lens. Where the objective lens has a focal length within the long focal length range, exposure calculation is carried out in the step #66 according to a program Pt that is predetermined properly to the long-focal-length lens. Where the objective lens has a focal length within the medium focal length range, exposure calculation is carried out in the step #67 according to a program Pn that is predetermined properly to the medium-focal-length lens. In a step #69, a control value calculated by the microcomputer $MC_2$ or the microcomputer $MC_0$ is displayed on the display unit $DSP_1$ on the camera body.

A step #70 waits until the release switch $S_2$ is closed. When the switch $S_2$ is closed, a step #71 ascertains whether the shutter switch $S_4$ is opened upon completion of the charging of the shutter. If the release switch $S_2$ is closed and the shutter switch $S_4$ is open, then control goes to a release routine starting with a step #80. If the release switch $S_2$ is open at the step 70 or the shutter switch $S_4$ is closed at the step 71, then a step #72 ascertains whether the photometric switch $S_1$ is closed or not. If the photometric switch $S_l$ is closed, then control goes back to the step #51. If the photometric switch $S_1$ is open, then all of the displays are de-energized in a step

73, and the transistor $BT_1$ is rendered non-conductive in a step #74 to cut off the power supply from the power supply line $+V_1$, followed by a step #75 permitting all of the interruption.

In the release routine, an "L" pulse is produced by the microcomputer $MC_0$ to the terminal IP in the step #80, and the number of aperture stopping down steps (Av - Avo) is calculated by reducing the minimum F number Avo from the calculated aperture value Av in a step #81, the calculated number of aperture stopping down steps being set in a register AVCR in the microcomputer $MC_0$. Thereafter, the release circuit RM is operated to energize a release magnet in a step #82, thereby starting to stop down the aperture of the objective lens. A step #83 then ascertains whether the content of the register AVCR is "0" or not. If not "0", then control proceeds to a step #84 to see if there is a pulse applied from the encoder EC. If there is an encoder pulse, then the content of the register AVCR is decremented by 1 and the result is set in the register AVCR again in a step #85. Control then returns to the step #83 to ascertain whether the content of the register AVCR is "0" or not.

The above cycle (#83 - #85) is repeated until the content of the register AVCR becomes "0". If the content of the register AVCR reaches "0", then control goes from the step #83 to a step #86 in which an aperture control magnet is operated by the aperture control circuit AM to interrupt the stopping down of the aperture. A step #87 then ascertains whether the mirror switch $S_3$ is closed by the raised main mirror. If the mirror switch $S_3$ is not closed, the step #87 waits until it is closed. If the mirror switch $S_3$ is closed, then the first-curtain control circuit 1M is operated to energize a first-curtain magnet to start moving the first curtain 1c in a step #88. The exposure time is counted in a step #89. Upon elapse of the time period corresponding to the calculated shutter speed Tv, the second-curtain control circuit 2M is operated to energize a second-curtain magnet to start moving the second curtain 2C in a step #90. A step #91 then waits until the shutter switch $S_4$ is closed in response to the completion of travel of the second curtain. If the shutter switch $S_4$ is closed, then control goes to the step #72 after a period of time that is required for the main mirror to be lowered and stabilized.

Figure 23:
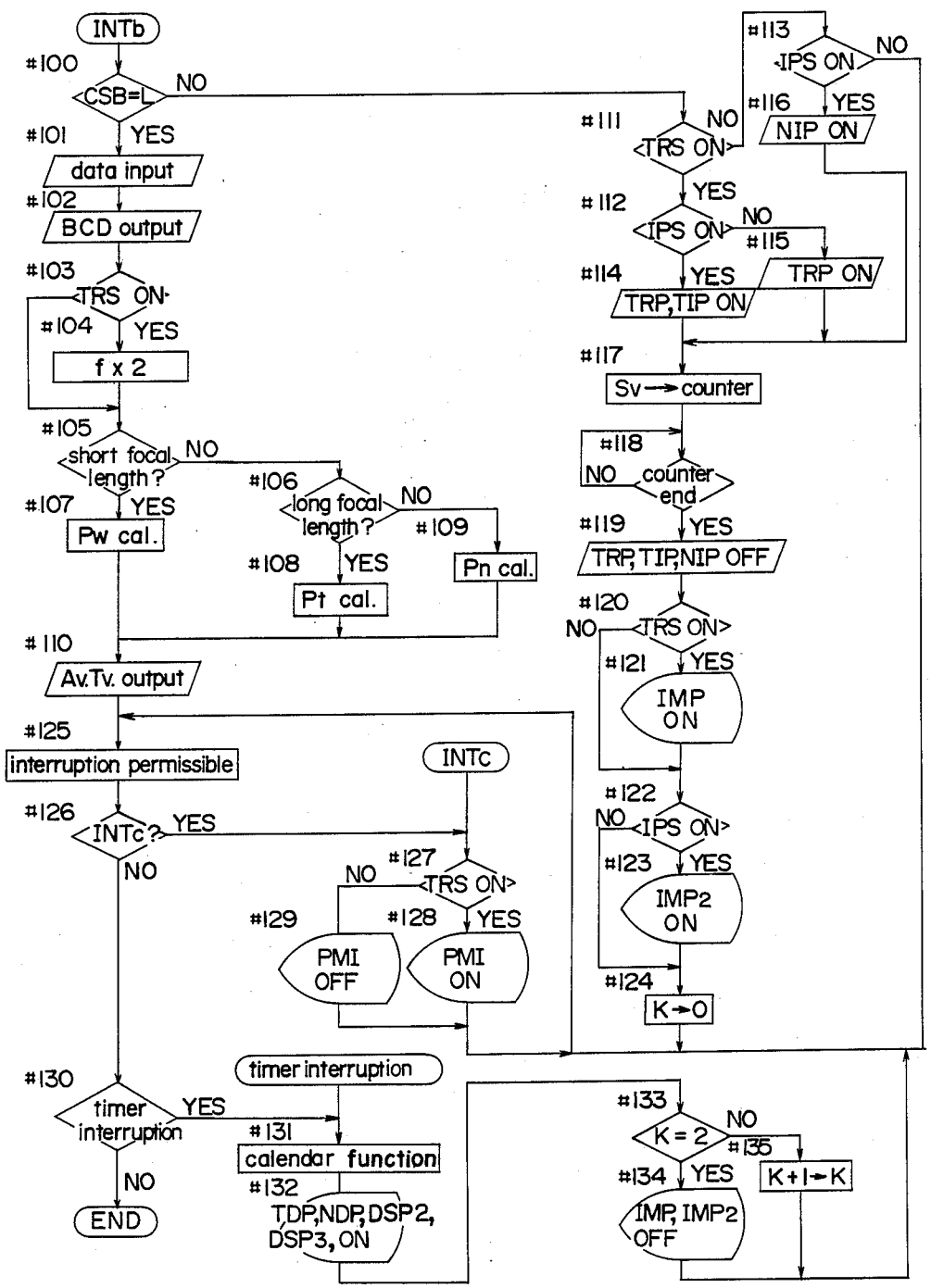
FIG. 23 is a flowchart of operation of a micro-computer in the back cover.

FIG. 23 shows a flowchart of an operation sequence of the microcomputer $MC_2$. This flow is initiated when the output terminals IP and CSB of the microcomputer $MC_0$ becomes "L". More specifically, as shown in FIG. 21, the output of the AND gate $AN_1$ is inverted to the "L" level when the output terminals IP and CSB of the microcomputer $MC_0$ becomes "L". This output of the AND gate $AN_1$ is applied to the interrupt terminal INTb of the microcomputer $MC_2$. The flow of FIG. 23 is started when the interrupt terminal INTb becomes "L".

When such an interruption occurs, a step #100 ascertains whether the terminal CSB is "L" to allow data transmission between the microcomputers $MC_0$, $MC_2$. If the terminal CSB is "L" allowing such data transmission, then the data items used for the exposure calculation such as minimum F-number Avo, maximum F-number Avmax, longest shutter speed Tvo, shortest shutter speed Tvmax, film sensitivity Sv, TTL exposure measurement at open aperture Bv - Avo, and focal length f, are delivered from the microcomputer $MC_o$ to the microcomputer $MC_2$ through the serial data bus DOUT in a step #101. Then, data BCD indicating that the interchangeable back cover is properly mounted on the camera body is delivered from the back cover in a step #102.

A step #103 thereafter ascertains whether the photographing mode selector switch TRS is closed to see if the camera is in the pseudo focal length photographing mode or not. If in the pseudo focal length photographing mode, indicating that the switch TRS is closed, control goes to a step #104 in which focal length data f of the objective lens is doubled. This is to double the focal length used for calculation since the equivalent focal length on a print is twice larger than the actual focal length of the objective lens in the pseudo focal length photographing mode.

Figure 22:
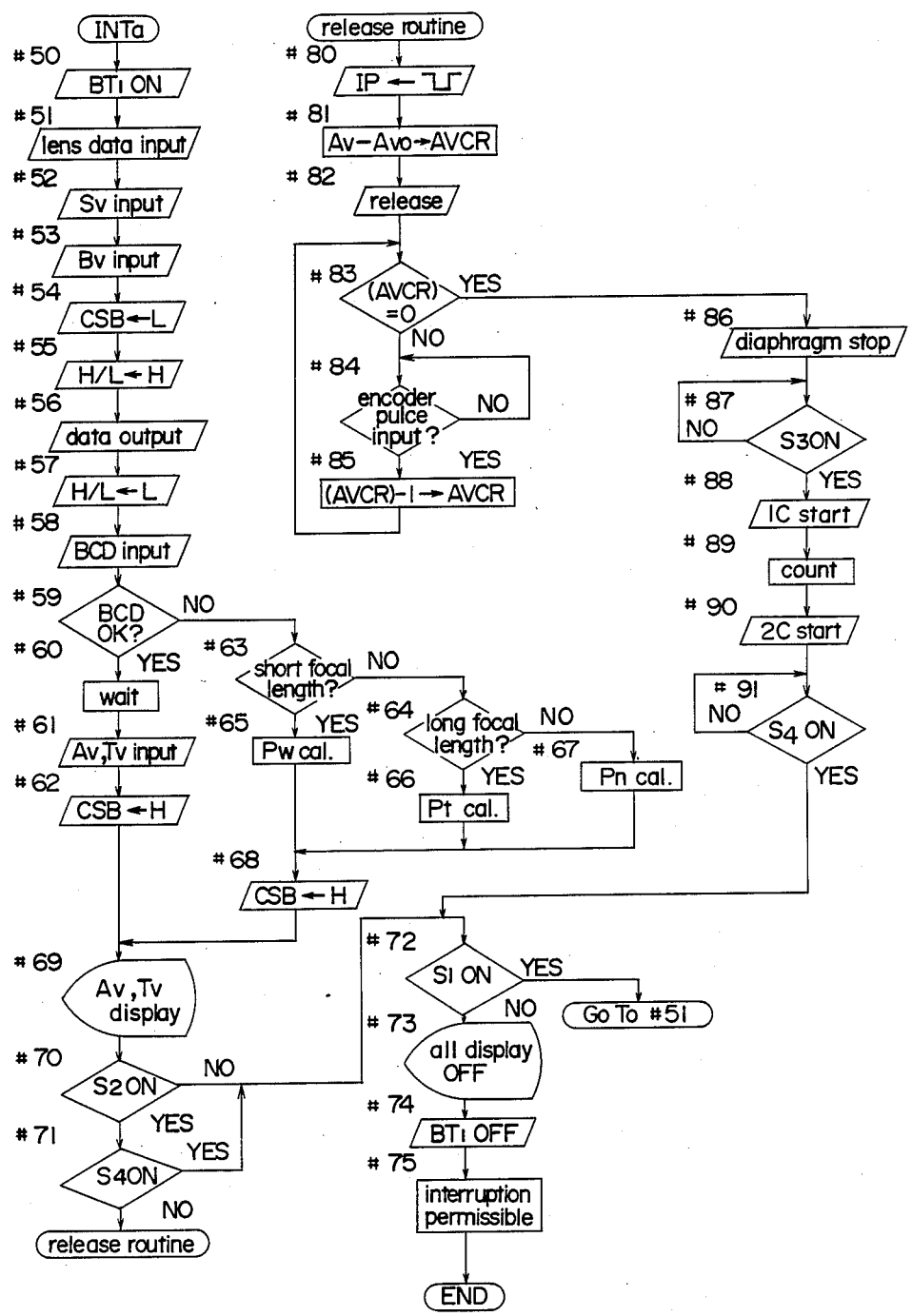
FIG. 22 is a flowchart of operation of a micro-computer in the camera body.

In steps #105 through #109, a program corresponding to the focal length of the objective lens (the equivalent focal length in the pseudo focal length photographing mode) is selected, and exposure calculation is effected according to the selected program, in the same manner as with the steps #63 through #67 shown in FIG. 22. Then, data items of proper aperture value Av and proper shutter speed Tv calculated according to the selected program are delivered through the serial data bus DIN to the microcomputer $MC_0$ in a step #110.

If the terminal CSB is not "L" in the step #100, indicating that no data can be transmitted between the microcomputers $MC_0$, $MC_2$, then control goes to a step #111 which ascertains whether the photographing mode selector switch TRS is closed or not. Irrespective of whether the switch TRS is closed or not, a step #112 or #113 determines whether the date recording selector switch IPS is closed to see if the date recording is selected or not. If the pseudo focal length photographing mode is selected and the date recording is selected, then the light source TRP for recording the signal indicative of the pseudo focal length photographing mode and the light source TIP for recording the date in the pseudo focal length photographing mode are energized in a step #114. If only the pseudo focal length photographing mode is selected and the date recording is not selected, then only the light source TRP is energized in a step #115. If only the date recording is selected and the pseudo focal length photographing mode is not selected, only the light source NIP for recording the date in the real focal length photographing mode is energized in a step #116.

In a next step #117, the film sensitivity data Sv is set in a counter in the microcomputer $MC_2$ and that counter is started in order to set a recording time according to the sensitivity of the loaded film. A step #118 waits until the counting operation of the counter is finished. If the counting operation is finished, then control goes to a step #119 in which the energized light source or light sources are de-energized. Operation from steps #119 through #124 is exactly the same as that from the steps #30 through #35 in FIG. 8, and hence will not be described.

If the date recording selector switch IPS is not open in the step #113, i.e., if the pseudo focal length photographing mode and the date recording are not selected, then the recording process from the steps #117 to #124 is not effected, and control jumps to a step #125. After the recording process is ended, control also goes from the step #124 to the step #125.

The step #125 permits all of interruption. Interrupts that can take place on the microcomputer $MC_2$ also include, in addition to the interrupt initiated by the interrupt signal applied to the interrupt terminal INTb, an interrupt initiated by an interrupt signal applied to the interrupt terminal INTc by the pulse generator PG which generates an "L" pulse in response to opening and closing of the photographing mode selector switch TRS.

A step #126 ascertains whether there is an interrupt signal from the interrupt terminal INTc or not. If an interruption occurs, then control goes to a step #127 which detects whether the photographing mode selector switch TRS is open or closed. If the switch TRS is closed, indicating that the pseudo focal length photographing mode is selected, then elements indicative of the pseudo focal length photographing mode are energized on the liquid crystal display units $DSP_2$, $DSP_3$ in a step #128. If the switch TRS is open, indicating that the real focal length photographing mode is selected, then the elements indicative of the pseudo focal length photographing mode are de-energized on the liquid crystal display units $DSP_2$, $DSP_3$ in a step #129. Control returns from the steps #128, #129 to the step #125.

If there is no interruption from the interrupt terminal INTc in the step #126, then control proceeds to a step #130 to ascertain whether there is a timer interruption. The microcomputer $MC_2$ contains a timer which allows a timer interruption to take place every second for performing a calender function in the same manner as with the timer interrupt routine shown in FIG. 9.

If there is a timer interruption in the step #130, then the second, minute, hour, date, month, and year are incremented in a step #131, and the date, month, and year are displayed on the date-recording liquid crystal display units TDP, NDP in the back cover, the liquid crystal display unit $DSP_2$ outside the back cover, and the viewfinder liquid crystal display unit $DSP_3$ in a step #132.

A step #133 ascertains whether the content of the register K is "2" or not. If "2", then the recording completion displays $IMP_1$, $IMP_2$ on the liquid crystal display unit $DSP_2$ are de-energized in a step #125, and control goes to the step #134. If not "2", then control goes to a step #135 in which "1" is added to the register K. With the recording completion displays $IMP_1$, $IMP_2$ on the liquid crystal display unit $DSP_2$ remaining energized, control goes to the step #125.

According to the camera accessory of the present invention, there may be manual switching required between the pseudo focal length photographing mode and the real focal length photographing mode, and pictures may be always taken in the pseudo focal length photographing mode once the camera accessory is mounted on the camera body. The camera accessory may be printed on its outer surface with information indicating a camera accessory for use in the pseudo focal length photographing mode. While the camera accessory has a date recording unit in the above embodiments, such a date recording unit may be dispensed with, or a recording unit capable of recording various data items other than the date may be employed in the camera accessory. Although only one printed range is available in the pseudo focal length photographing mode in the above embodiments, a selection of printed ranges may be provided.

By using the camera accessory of the invention on a conventional camera, pictures can easily be taken in the pseudo focal length photographing mode. The camera accessory of the invention is highly advantageous over known focal length converting accessories as to optical performance, size, price, and automatic focusing system.

With a camera accessory of the invention being purchased, it is not necessary to buy a special camera having a pseudo focal length photographing mode. Therefore, the user already possessing a camera only needs to buy a camera accessory of the invention, without a large expenditure of money.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A camera accessory mountable on a camera body, comprising:

an accessory housing;

means contained within said accessory housing for selecting a real focal length photographing mode and pseudo focal length photographing mode, in which an area in an image plane on a film is designated to be reproduced on a print, to produce a mode signal corresponding to the selected mode, the area being smaller than a normal area printed when the real focal length photographing mode is selected;

means contained within said accessory housing for detecting a signal relating to an exposure operation of the camera body to produce a detecting signal;

means, in response to the detecting signal, for recording information relating to the selected mode in accordance with the mode signal, said information recording means being contained within said accessory housing;

means contained within said accessory housing for indicating the selected mode in accordance with the mode signal; and means for mounting said accessory housing on said camera body.

2. A camera accessory as claimed in claim 1, wherein the indicating means includes means for indicating, in a finder image formed by a finder optical system provided in the camera body, an area to be reproduced on the print when the pseudo focal length photographing mode has been selected.

3. A camera accessory as claimed in claim 2, wherein the area indicating means includes means for indicating, in the finder image, an image of a frame indicative of the area to be reproduced when the pseudo focal length photographing mode has been selected.

4. A camera accessory as claimed in claim 1, further comprising means for producing data of date, and means for recording the data on the film in response to the detecting signal.

5. A camera accessory as claimed in claim 1, further comprising means for receiving, from the camera body, a set of exposure data utilized for calculating a proper exposure condition, means for calculating a proper exposure condition in accordance with the received set of exposure data to produce an exposure control signal indicative of the calculated proper exposure condition, and means for producing the exposure control signal toward the camera body.

6. A camera accessory as claimed in claim 1, further comprising means for attaching the camera accessory to the camera body.

7. A camera accessory as claimed in claim 6, wherein the attaching means includes means for mounting the camera accessory on the camera body in place of a back cover of the camera body.

8. A camera accessory mountable on a camera body, comprising:
   an accessory housing;
   means contained within said accessory housing for detecting a signal relating to an exposure operation of the camera body to produce a detecting signal;
   means contained within said accessory housing for recording a pseudo focal length photographing mode signal on a film loaded in the camera body in response to the detecting signal, the pseudo focal length photographing mode signal being read out in a printing operation for printing an area smaller than a normal area printed when the pseudo focal length photographing mode signal has not been recorded on the film; and
   means for mounting said accessory housing on said cameral body.

9. A camera accessory as claimed in claim 8, further comprising means for indicating, in a finder image formed by a finder optical system provided in the camera body, an area to be reproduced on the print when the pseudo focal length photographing mode signal has been recorded.

10. A camera accessory as claimed in claim 9, further comprising means for area indicating means includes means for indicating, in the finder image, an image of a frame indicative of the area to be reproduced when the pseudo focal length photographing mode signal has been recorded.

11. A camera accessory as claimed in claim 9, further comprising means for displaying that the pseudo focal length photographing mode signal will be recorded.

12. A camera accessory as claimed in claim 8, further comprising means for producing data of date, and means for recording the data on the film in response to the detecting signal.

13. A camera accessory as claimed in claim 8, further comprising means for receiving, from the camera body, a set of exposure data utilized for calculating a proper exposure condition, means for calculating a proper exposure condition in accordance with the received set of exposure data to produce an exposure control signal indicative of the calculated proper exposure condition, and means for producing the exposure control signal toward the camera body.

14. A camera accessory as claimed in claim 8, further comprising means for attaching the camera accessory to the camera body.

15. A camera accessory as claimed in claim 14, wherein the attaching means includes means for mounting the camera accessory on the camera body in place of a back cover of the camera body.

* * * * *